United States Patent
Lee et al.

(10) Patent No.: US 9,776,928 B2
(45) Date of Patent: Oct. 3, 2017

(54) METHOD FOR PREPARING CARBON-BASED PARTICLE/COPPER COMPOSITE MATERIAL

(75) Inventors: Woo-Ram Lee, Daejeon (KR); Sang-Ho Kim, Daejeon (KR); Jong-Wuk Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 134 days.

(21) Appl. No.: 13/197,637

(22) Filed: Aug. 3, 2011

(65) Prior Publication Data

US 2012/0027934 A1    Feb. 2, 2012

Related U.S. Application Data

(63) Continuation of application No. PCT/KR2010/000730, filed on Feb. 5, 2010.

(30) Foreign Application Priority Data

Feb. 5, 2009   (KR) .................. 10-2009-0009287
Feb. 5, 2010   (KR) .................. 10-2010-0010860

(51) Int. Cl.
    *B05D 7/00*        (2006.01)
    *C04B 35/628*      (2006.01)
    (Continued)

(52) U.S. Cl.
    CPC ........ *C04B 35/62892* (2013.01); *C01B 31/02* (2013.01); *C01B 31/0253* (2013.01);
    (Continued)

(58) Field of Classification Search
    CPC ................... C04B 35/62892; C22C 32/0094
    (Continued)

(56) References Cited

U.S. PATENT DOCUMENTS 4,113,658 A *  9/1978  Geus ........................ 502/242
4,157,315 A *  6/1979  Michels et al. ........... 502/245
(Continued)

FOREIGN PATENT DOCUMENTS

CN     1934281 A      3/2007
CN   101069928 A    11/2007
(Continued)

OTHER PUBLICATIONS

Wang, Seed-mediated growth approach to shape-controlled synthesis of Cu2O particles, Journal of Colloid and Interface Science, 261 (2003), p. 565-568.*
(Continued)

*Primary Examiner* — Tabatha Penny
(74) *Attorney, Agent, or Firm* — Dentons US LLP

(57) ABSTRACT

The present invention relates to a method for preparing a carbon-based particle/copper composite material in which carbon-based particles such as graphite and copper are mixed, the method including mixing a solution of a polymer organic compound having a main chain of carbon and a copper precursor in a solvent, with a dispersion solution of carbon-based particles in a first dispersion medium to produce a mixture, adding a first reducing agent to the mixture to form composite particles in which copper (I) oxide particles are attached to the surface of the carbon-based particles, and sintering the composite particles under a non-oxidizing atmosphere. According to the preparing method, a composition material is obtained, in which carbon-based particles and copper are well mixed.

4 Claims, 3 Drawing Sheets

(51) Int. Cl.
  *C22C 32/00* (2006.01)
  *C01B 31/02* (2006.01)
  *C01B 31/04* (2006.01)
  *C01B 31/06* (2006.01)
  *C01G 3/02* (2006.01)

(52) U.S. Cl.
  CPC .......... *C01B 31/04* (2013.01); *C01B 31/0484* (2013.01); *C01B 31/065* (2013.01); *C01G 3/02* (2013.01); *C04B 35/62805* (2013.01); *C04B 35/62889* (2013.01); *C22C 32/0094* (2013.01); *B22F 2998/00* (2013.01); *B22F 2998/10* (2013.01); *C04B 2235/425* (2013.01)

(58) Field of Classification Search
  USPC .......................................................... 427/217
  See application file for complete search history.

(56) References Cited

U.S. PATENT DOCUMENTS

| | | | | |
|---|---|---|---|---|
| 6,306,795 | B1* | 10/2001 | Ryan et al. | 502/346 |
| 2007/0144305 | A1* | 6/2007 | Jablonski | B22F 1/0022 75/252 |
| 2007/0196641 | A1 | 8/2007 | Ichiki et al. | |

FOREIGN PATENT DOCUMENTS

| | | | |
|---|---|---|---|
| EP | 0 739 991 A1 | 10/1996 | |
| JP | 09-013101 | 1/1997 | |
| KR | 10-2005-0084099 A | 8/2005 | |
| KR | 100869026 * | 11/2008 | ............... B82B 3/00 |
| KR | 20090009419 A | 1/2009 | |
| KR | 10-2009-0012028 A | 2/2009 | |
| WO | 2006082962 A1 | 8/2006 | |
| WO | WO 2009/014392 A2 | 1/2009 | |

OTHER PUBLICATIONS

Xu Long-Shan et el. "Preparation of CNT's and Superfine Cu Compound Powder", vol. 21, No. 2 of Journal of Inorganic Materials, pp. 309-314, Mar. 2006.

Xu Long-Shan et el. "Thermal expansion of MWCNT-reinforced copper composite", Transactions of Nonferrous Metals Society of China, pp. 1065-1069, Dec. 2007.

Xu, et al., "Electrostatic-assembly carbon nanotube-implanted copper composite spheres," Nanotechnology, Great Britain, vol. 18, No. 43, Oct. 2007, 435607, 4 pages.

Wang, et al., "Metallization of multi-walled carbon nanotubes with copper by an electroless deposition process," Electrochemistry Communications, vol. 6, No. 10, Oct. 2004, pp. 1042-1044.

* cited by examiner

METHOD FOR PREPARING CARBON-BASED PARTICLE/COPPER COMPOSITE MATERIAL

This application is a continuation application of PCT/KR2010/00730, filed on Feb. 5, 2010, which claims priority to Korean Patent Application No. 10-2009-0009287, filed on Feb. 5, 2009, and Korean Patent Application No. 10-2010-0010860, filed on Feb. 5, 2010, all of which are incorporated herein by reference.

TECHNICAL FIELD

The present invention relates to a method for preparing a carbon-based particle/copper composite material in which carbon-based particles such as graphite and copper are mixed.

BACKGROUND ART

Copper is widely used in various fields of industry because of its high thermal and electrical conductivity and low price. In many cases, copper is used by itself, however, due to various reasons, in particular, like in the case of a heat sink, the use of copper mixed with carbon-based particles containing carbon as a main component, for example, graphite, SiC, carbon nanotubes, and the like, to form a composite material, is increasing.

In a carbon-based particle/copper composite material, the mixed state of carbon-based particles and copper is very important. When the mixed state of the two components is incompatible and the components exist separate from each other, it is impossible to obtain the material properties resulting from the complexation of the two components, and the mechanical properties reduce as well.

Because carbon-based particles and copper have different material properties, compatibility therebetween is poor. Conventionally, a liquid-phase sintering method, an impregnation method, and the like was used to prepare a carbon-based particle/copper composite material, but it was hard to achieve excellent compatibility of carbon-based particles and copper.

DISCLOSURE OF INVENTION

Technical Problem

It is an object of the present invention to provide a method for preparing a composite material in which carbon-based particles and copper are well mixed.

Technical Solution

To achieve the object of the present invention, a method for preparing a carbon-based particle/copper composite material according to an aspect of the present invention includes mixing a solution of a polymer organic compound having a main chain of carbon and a copper precursor in a solvent, with a dispersion solution of carbon-based particles in a first dispersion medium to produce a mixture, adding a first reducing agent to the mixture to form composite particles in which copper (I) oxide particles are attached to the surface of the carbon-based particles, and sintering the composite particles under a non-oxidizing atmosphere.

Also, a method for preparing a carbon-based particle/copper composite material according to another aspect of the present invention includes mixing a solution of a polymer organic compound having a main chain of carbon and a copper precursor in a solvent with a dispersion solution of carbon-based particles in a first dispersion medium to produce a mixture, adding a first reducing agent to the mixture to form composite particles in which copper (I) oxide particles are attached to the surface of the carbon-based particles, and dispersing the composite particles in a second dispersion medium and adding an excess of a second reducing agent thereto to reduce the copper (I) oxide particles into copper.

Also, a method for preparing a carbon-based particle/copper composite material according to still another aspect of the present invention includes mixing a solution of a polymer organic compound having a main chain of carbon and a copper precursor in a solvent with a dispersion solution of carbon-based particles in a first dispersion medium to produce a mixture, and adding an excess of a first reducing agent to the mixture to form composite particles in which the surface of the carbon-based particles is coated with copper.

In the method for preparing a composite material according to the present invention, the polymer organic compound may preferably include polyvinylpirrolidone and polyvinylalcohol, singularly or in combination. And, the copper precursor may be i) a copper carboxyl compound of formula 1, or ii) a carboxyl group-containing compound of formula 2 and a copper salt.

$$(R_1-COO)_2Cu \qquad \text{<Formula 1>}$$

where $R_1$ is an alkyl group having 1 to 18 carbon atoms.

$$R_1-COOH \qquad \text{<Formula 2>}$$

where $R_1$ is an alkyl group having 1 to 18 carbon atoms.

Also, in the method for preparing a composite material according to the present invention, the solvent for dissolving the polymer organic compound and the copper precursor, the first dispersion medium, and the second dispersion medium may be each, independently, water, $C_1$-$C_6$ low alcohol, dimethylformamide, dimethylsufoxide, tetrahydrofuran, and acetonitrile, singularly or in combination.

The carbon-based particles dispersed in the first dispersion medium may include, but not limited to, graphite, graphene, amorphous carbon, carbon nanotubes, diamond, and SiC, as long as they contain carbon as a main component.

Meanwhile, in the method for preparing a composite material according to the present invention, each of the first reducing agent and the second reducing agent may be, independently, $NaBH_4$, hydrazine, asocorbic acid, glucose, and ethylene glycol, singularly or in combination.

Advantageous Effects

In accordance with the method for preparing a carbon-based particle/copper composite material according to the present invention, a polymer organic compound contributes to improving the compatibility of copper (I) oxide particles and carbon-based particles, and consequently to the preparation of a composite material intermediate in which the copper (I) oxide particles are attached to the surface of the carbon-based particles. The reduction of the composite material intermediate leads to a composite material in which the carbon-based particles and copper are well mixed and which may be appropriately used as a heat sink.

BEST MODE

Figure 1:
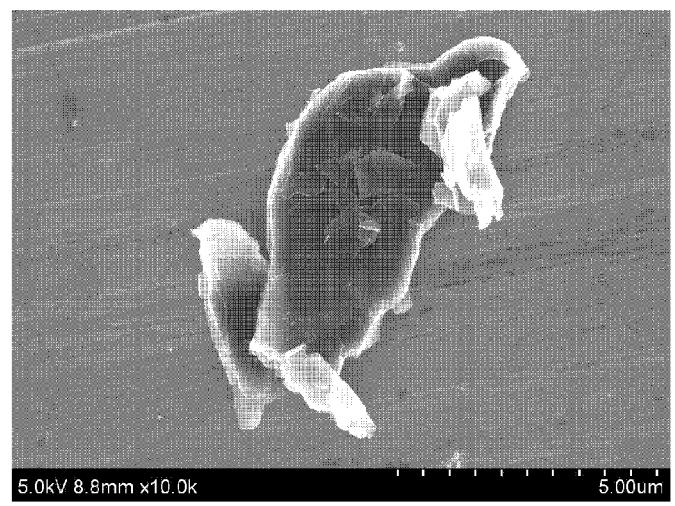
FIG. 1 shows a scanning electron microscope (SEM) image of graphite particles used in example 1.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A first method for preparing a composite material according to the present invention is described as follows.

First, a solution of a polymer organic compound having a main chain of carbon and a copper precursor in a solvent is mixed with a dispersion solution of carbon-based particles in a first dispersion medium to produce a mixture (Step 1).

The polymer organic compound has a main chain of carbon, and may preferably include, but not limited to, in particular, polyvinylpirrolidone and polyvinylalcohol, singularly or in combination, as long as it can be dissolved in a solvent.

The copper precursor may include any type of a copper precursor as long as it can form copper (I) oxide by a reducing agent as described below, and may be for example, i) a copper carboxyl compound of formula 1, or ii) a carboxyl group-containing compound of formula 2 and a copper salt.

where $R_1$ is an alkyl group having 1 to 18 carbon atoms.

where $R_1$ is an alkyl group having 1 to 18 carbon atoms.

For example, the copper carboxyl compound of formula 1 may be $(CH_3COO)_2Cu$, and the carboxyl group-containing compound of formula 2 may be $CH_3COOH$. Also, the copper salt may be, for example, nitride of copper, halide of copper, hydroxide of copper, and sulfide of copper, singularly or in combination.

For example, the solvent for dissolving the polymer organic compound and the copper precursor may include, but not limited to, water, $C_1$-$C_6$ low alcohol, dimethylformamide, dimethylsufoxide, tetrahydrofuran, and acetonitrile, singularly or in combination. A solvent containing water is preferred.

The carbon-based particles may include, but not limited to, graphite, graphene, amorphous carbon, carbon nanotubes, diamond, and SiC, as long as they contain carbon as a main component.

The first dispersion medium for dispersing the carbon-based particles may be equal to or different from the exemplary solvents as mentioned above, and the present invention is not limited to the exemplary solvents.

The dispersion solution of the carbon-based particles in the first dispersion medium is prepared by putting the carbon-based particles into the first dispersion medium and performing a typical method, for example, a chemical method such as acid treatment, a mechanical method such as ultrasonic treatment, and the like.

Next, a first reducing agent is added to the resultant mixture to form composite particles in which copper (I) oxide particles are attached to the surface of the carbon-based particles (Step 2).

The first reducing agent used reacts with the copper precursor to form copper (I) oxide particles. Here, the copper (I) oxide particles are formed in such a way to be physically attached to the surface of the carbon-based particles, which are herein referred to as composite particles. The composite particles serve as an intermediate that may lead to a composite material in which carbon-based particles and copper are well mixed. As mentioned above, the polymer organic compound dissolved in the mixed result is supposed to be the reason why the composite particles are formed in which copper (I) oxide particles are attached to the surface of carbon-based particles. The polymer organic compound has a main chain of carbon, and thus is compatible with carbon-based particles. In particular, polyvinylpirrolidone or polyvinylalcohol is preferably selected to ensure compatibility. The polymer organic compound dissolved in the mixed result covers the surface of copper (I) oxide particles, partially or entirely. Accordingly, it is explained that copper (I) oxide particles are easily attached to the surface of carbon-based particles.

The first reducing agent may include, but not limited to, $NaBH_4$, hydrazine, asocorbic acid, glucose, and ethylene glycol, singularly or in combination, as long as it can react with a copper precursor to form copper oxide particles. As described in the Korean Patent Registration No. 10-0869026, copper (I) oxide particles may be formed in the structure of aggregates of copper (I) oxide ultrafine particles, by the action of a reducing agent and a copper precursor, the entire content of which is incorporated herein by reference.

When the composite particles separated from the result of step 2 by centrifugal separation, filtering, and the like are sintered under a non-oxidizing atmosphere, the copper (I) oxide particles are reduced into copper to obtain a carbon-based particle/copper composite material (Step 3). The copper (I) oxide particles are reduced into copper while the copper (I) oxide particles are attached to the surface of the carbon-based particles, and accordingly, the carbon-based particles and copper are well mixed in the obtained composite material.

The non-oxidizing atmosphere may include, but not limited to, an inert gas atmosphere such as nitrogen, a vacuum atmosphere, and a reducing gas atmosphere such as hydrogen, as long as it allows copper (I) oxide particles to be reduced into copper.

Meanwhile, according to a second method for preparing a composite material of the present invention, step 3 may be replaced by the following step. In other words, the composite particles obtained according to step 2 are dispersed in a second dispersion medium, and an excess of a second reducing agent is added thereto. Then, the copper (I) oxide particles are reduced into copper by an excess of the second reducing agent, to obtain a carbon-based particle/copper composite material.

Like the first dispersion medium, the second dispersion medium may include, but not limited to, water, $C_1$-$C_6$ low alcohol, dimethylformamide, dimethylsufoxide, tetrahydrofuran, and acetonitrile. The second dispersion medium may be the same or different kinds of liquids from the first dispersion medium.

And, according to a third preparing method of the present invention, a composite material may be prepared based on the integration of steps 2 and 3 of the second preparing method. In other words, an excess of a reducing agent is added to the mixed result obtained according to step 1, and reactions of steps 2 and 3 take place in succession to obtain a carbon-based particle/copper composite material.

MODE FOR INVENTION

Hereinafter, the present invention will be described in detail through examples. The description proposed herein is just a preferable example for the purpose of illustrations only, not intended to limit the scope of the invention, so it should be understood that other equivalents and modifications could be made thereto without departing from the spirit and scope of the invention.

Example 1

(1) 3 mg of graphite having an average particle size of 7 μm was put into 10 ml of ethylene glycol, and ultrasonic treatment was performed for 1 hour to prepare a dispersion solution. 50 mg of copper (II) acetate and 200 mg of polyvinylpirrolidone (PVP) were dissolved in 5 ml of water, and then added to the prepared dispersion solution, followed by agitation.

(2) 15 mg of $N_2H_5OH$ was dissolved in 5 ml of water and dropped in the mixed solution obtained according to step 1. The particles were separated from the mixed solution, and washed with water twice and dried.

(3) The particles obtained according to step 2 were sintered for 5 minutes under a nitrogen atmosphere after temperature was increased to 700° C. at a temperature increase rate of 40° C./min.

Example 2

The particles obtained according to steps 1 and 2 of example 1 were re-dispersed in water, and a $NaBH_4$ aqueous solution was added thereto in excess. The particles were separated from the dispersion solution, and washed with water twice and dried.

Comparative Example 1

The comparative example 1 was carried out according to steps 1 and 2 of example 1 except that polyvinylpirrolidone (PVP) was not added.

Figure 2:
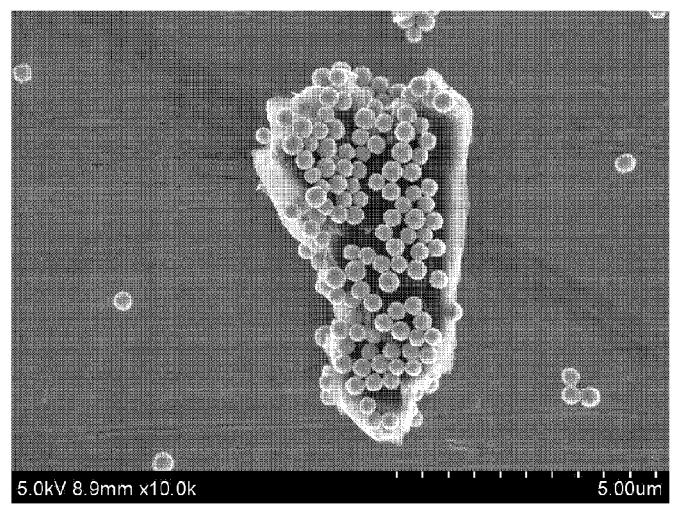
FIG. 2 shows a SEM image of graphite/copper (I) oxide composite particles obtained according to steps 1 and 2 of example 1.
Figure 3:
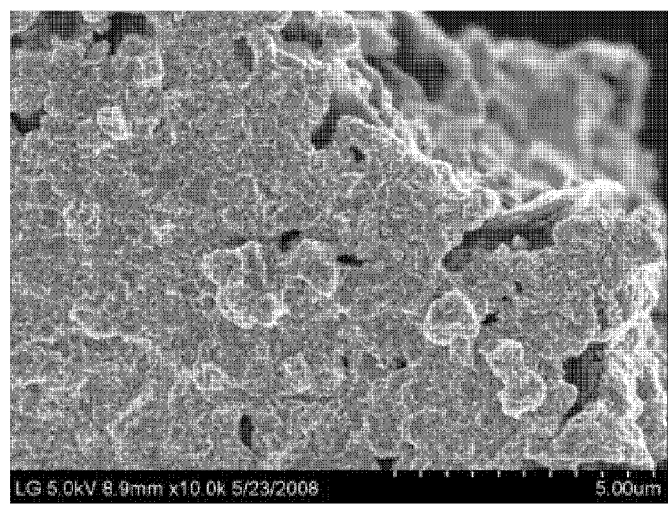
FIG. 3 shows a SEM image of graphite/copper composite particles finally obtained according to example 1.
Figure 4:
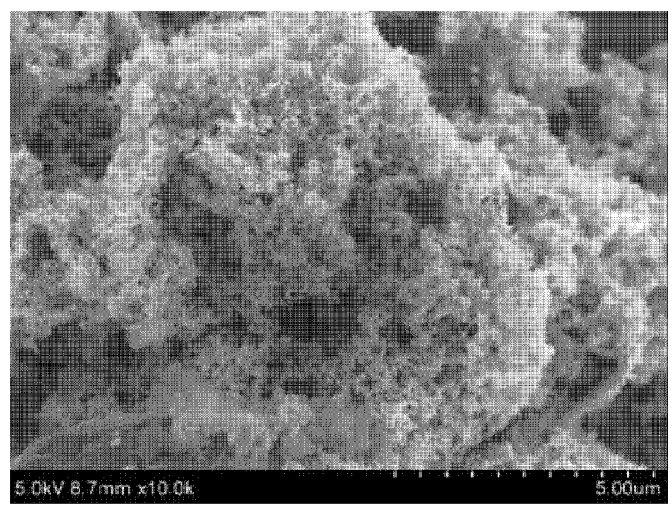
FIG. 4 shows a SEM image of graphite/copper composite particles finally obtained according to example 2.

FIG. 1 shows a SEM image of graphite particles used in example 1. The particles obtained according to steps 1 and 2 of example 1 are formed of composite particles in which copper (I) oxide particles are attached to the surface of graphite particles, as shown in a SEM image of FIG. 2. It is found that generally, copper (I) oxide particles are favorably attached to the surface of graphite particles. When the composite particles are sintered under an inert gas atmosphere according to example 1, copper (I) oxide particles are reduced to form composite particles in which graphite particles are entirely coated with copper, as shown in FIG. 3. When the composite particles of FIG. 2 are treated with an excess of a reducing agent according to example 3, copper (I) oxide particles are reduced to form composite particles in which graphite particles are entirely covered with copper particles like a sponge, as shown in FIG. 4. Here, it is supposed that aggregation of carbon/copper composite particles during a sintering or reducing step is the reason why a particle size of the composite particles of FIGS. 3 and 4 is larger than that of FIG. 2.

Figure 5:
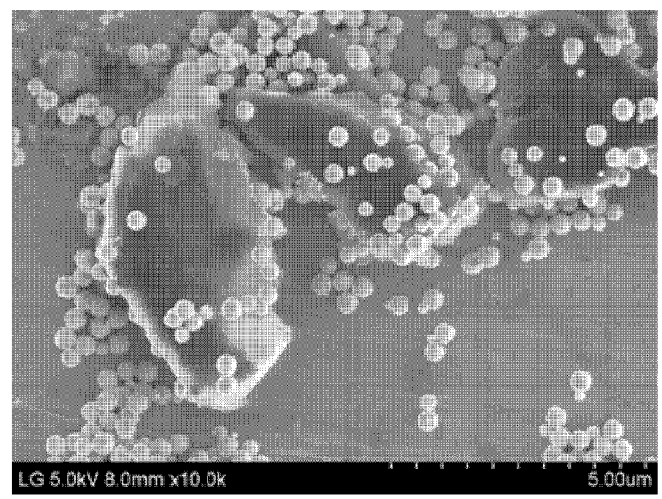
FIG. 5 shows a SEM image of graphite particles and copper (I) oxide particles obtained according to comparative example 1.

Meanwhile, FIG. 5 shows a SEM image of particles obtained according to comparative example 1. Unlike FIG. 2 according to example 1, copper (I) oxide particles of FIG. 5 are isolated from graphite particles, but not attached to the surface of graphite particles.

What is claimed is:

1. A method for preparing a carbon-based particle/copper composite material, comprising:

mixing a polyvinyl pyrrolidone and a copper carboxyl compound of Formula 1:

$(R_1—COO)_2Cu$                                                                          <Formula 1> where $R_1$ is methyl,
in water to form a solution;

mixing carbon-based particles each having a surface with a first dispersion medium using an ultrasonic treatment to produce a dispersion, wherein the carbon-based particles are graphite;

mixing the solution and the dispersion to form a mixture;

adding a first reducing agent to the mixture to form composite particles in which copper (I) oxide particles are attached to the surface of the carbon-based-particles, wherein the first reducing agent is $NaBH_4$, hydrazine, or mixtures thereof; and sintering the composite particles under a non-oxidizing atmosphere to form composite particles in which the surface of the carbon-based particles is coated with copper.

2. The method for preparing a carbon-based particle/copper composite material according to claim 1, wherein the first dispersion medium is any one selected from the group consisting of water, $C_1$-$C_6$ low alcohol, dimethylformamide, dimethylsulfoxide, tetrahydrofuran, and acetonitrile, or mixtures thereof.

3. The method for preparing a carbon-based particle/copper composite material according to claim 1, wherein the non-oxidizing atmosphere is any one selected from the group consisting an inert gas atmosphere, a vacuum atmosphere, and a reducing gas atmosphere.

4. The method for preparing a carbon-based particle/copper composite material according to claim 1, wherein the first dispersion medium is ethylene glycol.

* * * * *